R. E. HICKS.
REVOLUBLE WATER COOLED VALVE AND IGNITER FOR COMBUSTION MOTORS.
APPLICATION FILED DEC. 15, 1915.
1,269,812.
Patented June 18, 1918.
2 SHEETS—SHEET 1.
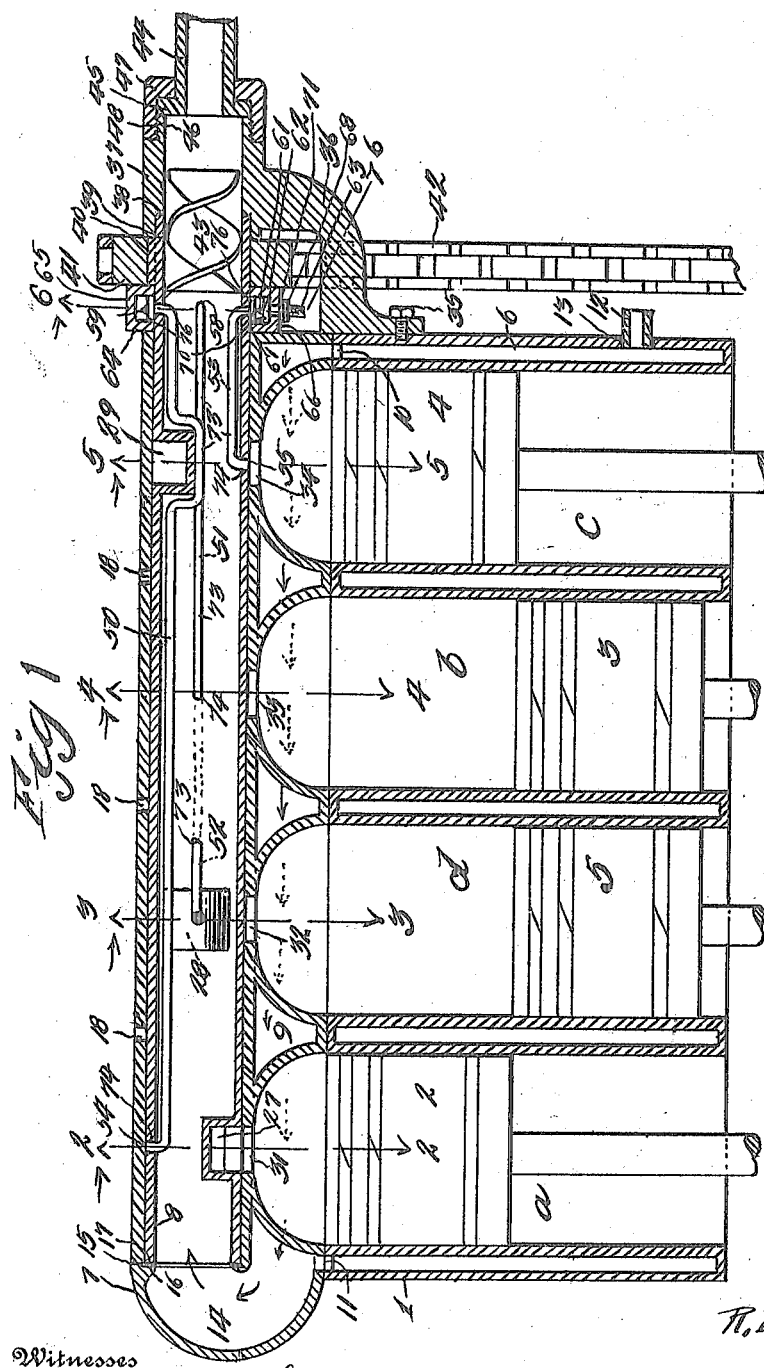
Witnesses
Inventor
R. E. Hicks
By
his Attorneys R. E. HICKS.
REVOLUBLE WATER COOLED VALVE AND IGNITER FOR COMBUSTION MOTORS.
APPLICATION FILED DEC. 15, 1915.
1,269,812.
Patented June 18, 1918.
2 SHEETS—SHEET 2.
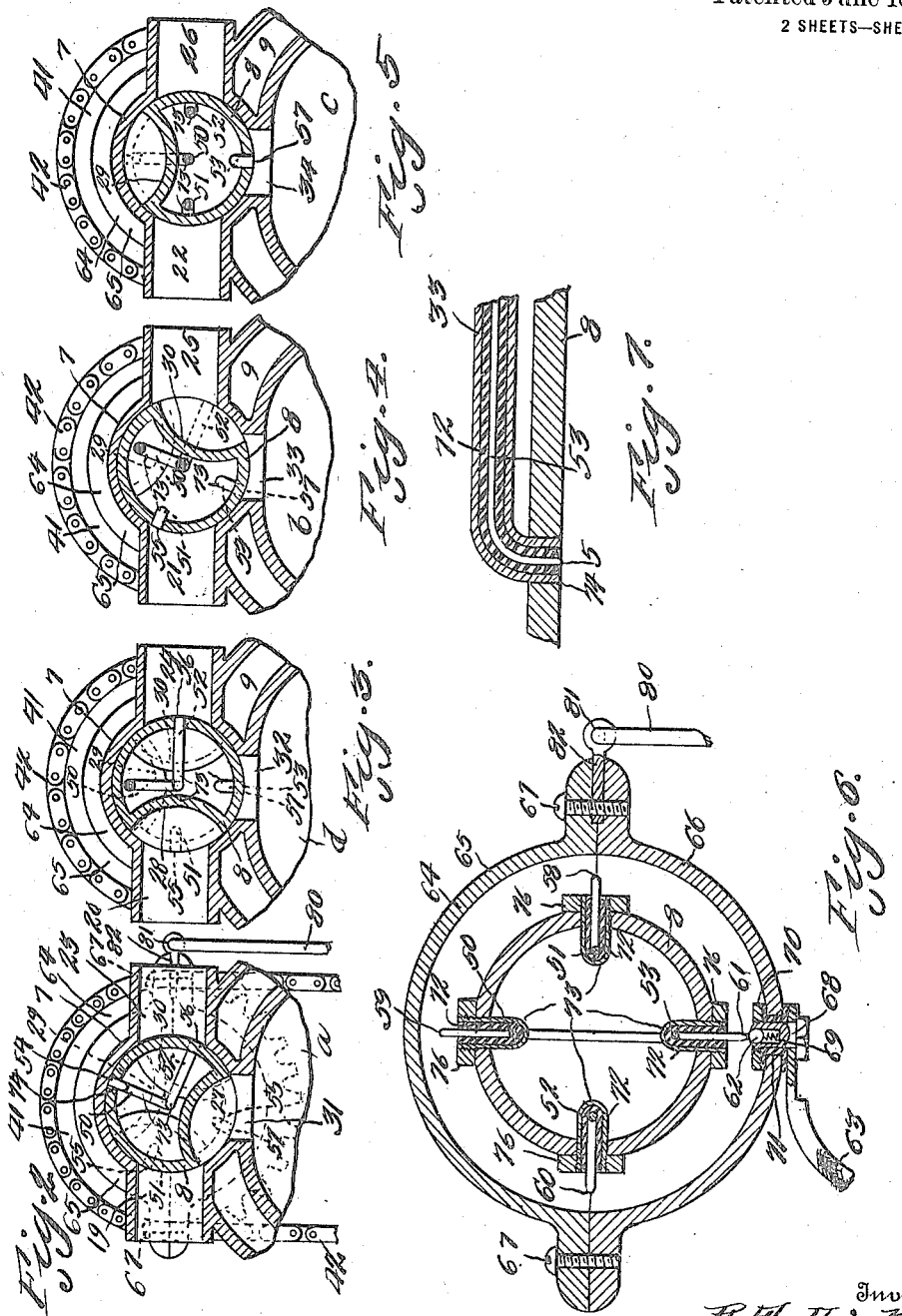

UNITED STATES PATENT OFFICE.

RAY E. HICKS, OF MERNA, NEBRASKA.

REVOLUBLE WATER-COOLED VALVE AND IGNITER FOR COMBUSTION-MOTORS.

1,269,812.　　　　　Specification of Letters Patent.　　Patented June 18, 1918.

Application filed December 15, 1915.　Serial No. 66,953.

*To all whom it may concern:*

Be it known that I, RAY EVERETT HICKS, a citizen of the United States, residing at Merna, in the county of Custer, State of Nebraska, have invented a new and useful Revoluble Water-Cooled Valve and Igniter for Combustion-Motors; and I do hereby declare the following to be a full, clear, and exact description of the invention, such as will enable others skilled in the art to which it appertains to make and use the same.

This invention relates to an internal combustion engine or motor, and particularly to an improved efficient, and practical revoluble water cooled valve including an igniting mechanism, for use in connection with the motor or engine.

One of the objects of the invention is to provide an elongated hollow valve extending transversely of the ends of the four cylinders of the engine, and having depressions, so coöperating with and connecting the combustion chambers of the cylinders and the intake and exhaust ports, that as one cylinder is intaking a charge, another is firing, a third is compressing a charge, whereas the fourth is exhausting the utilized gases. In other words, these operations are consecutively occurring.

Another object of the invention is the provision of a sparking mechanism including a timer, adapted to be adjusted for advancing and retarding or delaying the spark.

In practical fields the details of construction may necessitate alterations, falling within the scope of what is claimed.

The invention comprises further features and combinations of parts, as hereinafter set forth, shown in the drawings and claimed.

In the drawings:

Figure 1 is a vertical sectional view through a four cylinder engine, illustrating the improved revoluble water cooled valve and igniting mechanism as applied thereto.

Fig. 2 is a sectional view on line 2—2 of Fig. 1 showing the valve as having moved, whereby one of the depressions or pockets is in such a position relative to the intake port and the combustion chamber of one of the cylinders, that a charge is on the verge of entering the combustion chamber.

Fig. 3 is a sectional view on line 3—3 of Fig. 1, showing the valve as having moved, so as to cut off communication between the intake and the combustion chamber.

Fig. 4 is a sectional view on line 4—4 of Fig. 1, showing one of the depressions of the valve in such a position that an exhaust is on the verge of taking place.

Fig. 5 is a sectional view on line 5—5 of Fig. 1, showing the position of the depression or pocket of the valve, at the time of the firing stroke.

Fig. 6 is a sectional view on line 6—6 of Fig. 1, showing the adjustable sparking mechanism timing ring, and illustrating four sparking devices carried by the revoluble valve.

Fig. 7 is a detail sectional view on an enlarged scale of a portion of the wall of the revoluble valve, illustrating how the tubes covering the insulated wires of the sparking devices, are connected to the valve.

Referring more especially to the drawings, 1 designates the engine casing, which, in the present instance, has four cylinders *a*, *b*, *c* and *d*, in which the pistons 2, 3, 4 and 5 are shown as on the verge of their respective intake, exhaust, explosion, and compression strokes. The casing 1 is constructed so as to provide a suitable water jacket 6, whereby all four cylinders are kept cool. The upper portion of the engine casing is provided with a suitable extension valve casing 7, in which the elongated or tubular hollow valve 8 is mounted. The extension casing 7 below where it receives the valve 8 is formed with a passage 9, which is in communication at 10 and 11 with the water jacket or space 6 of the cylinders, and which water jacket or space 6 receives its supply from any suitable source through the pipe 12, which may be connected to the cylinder as shown at 13. The space or passage 9 at one end terminates in a bend or turn, as shown at 14, by which the passage or space 9 is in communication with the interior of the revoluble valve 8. The valve 8 when in the casing 7 abuts against the packing 15, which is interposed between the shoulder 16 and the end portion 17 of the revoluble tubular valve. The casing 7 is provided with a plurality of apertures 18, whereby lubricant may be supplied to the cylindrical surface of the revoluble tubular valve. Referring more especially to Figs. 3, 4 and 5 it is to be seen that the casing 7 is provided with four intake openings 19, 20, 21, and 22, and four exhaust openings or ports 23, 24, 25 and 26. Also referring to said Figs. 2, 3, 4 and 5, it is to be seen that the tubular valve 8 is provided with four pockets or depressions 27, 28, 29 and 30, The upper ends of the cylinders a, b, c, and d are provided with ports 31, 32, 33 and 34. Secured by a suitable bolt 35 to the casing 1 is a bracket 36 having a tubular bearing 37, into which one end of the revoluble tubular valve extends, so as to contact with the shoulder 38, in order to prevent excessive axial movement of the valve. Secured upon the end portion 39 of the tubular valve by means of the rib 40, so as to rotate with the valve is a sprocket 41, about which the sprocket chain 42 travels. In practice, this sprocket chain is designed to be so connected or geared to the crank shaft of the engine, whereby the tubular valve will be rotated, so that each depression or pocket will make one complete revolution, while each respective piston is making its firing, exhaust, suction and compression strokes. The pipe 12 may be connected to the radiator (not shown) in any suitable manner so that the cooled water from the radiator may be conveyed to the water space or jacket 6. Arranged on the interior of one end of the tubular valve and connected to the valve so as to rotate therewith is a screw water circulator or auger 43, so that as the tubular valve rotates or revolves, a suction is created upon the interior of the tubular valve, and in the passage 9, so as to draw the water from the water space or jacket 6, and force it through the pipe or tube 44, which in turn may be connected in any suitable manner (not shown) to the radiator for conveying the water back to the radiator to be cooled. The flanged end 45 of the tube or pipe 44 is clamped against the end portion 46 of the tubular bearing 37, by means of the cap 47, which is threaded at 48 to the tubular bearing 37.

It is to be noted that the tubular valve 8 carries the sparking wires 50, 51, 52 and 53, so that their sparking terminals 54, 55, 56 and 57 will register with the ports 31, 32, 33 and 34, while their contacting terminals 58, 59, 60 and 61 are arranged in circular alinement, so that each one of said terminals will contact with the ball terminals 62, to which current from any suitable source may be supplied by means of the wire 63. Rotatably carried by the tubular valve between the engine casing 1 and the sprocket 41 is a spark timer 64, which consists of a ring, which is U-shaped in cross section, and comprising two sections 65 and 66, secured together by the screws 67. The ball terminal 62 is carried in the tubular shank of the screw 68, there being a coil spring 69 in the shank, and on which spring the ball terminal is yieldably supported, so that as the revoluble valve rotates the contacting terminals will sweep against the ball terminal. A suitable plate 70 is threaded to one end of the tubular shank of the bolt 68, so as to hold the same in fixed relation to the ring 64, there being suitable insulation 71, to prevent short circuiting. The sparking wires 50, 51, 52 and 53 are provided with suitable insulation 72. Said sparking wires and their insulation are fitted closely within the tubes 73, thereby preventing the insulation from being contacted with by the water passing through the tubular valve. Where the sparking terminals of the sparking wires terminate the tubes 73 may be secured in the wall of the tubular valve, either by threads or the like, particularly brazing, as shown at 74. However, where the contacting terminals of the sparking wires terminate, the angular end of the tubes 73 pass through the wall of the revoluble valve, and have their angular ends provided with nuts 76, to hold the tubes securely in place. It is to be noted that as each contacting terminal of the sparking wires sweep against the ball terminal, a circuit is closed, and as a result of which the circuit jumps the gap between each sparking terminal of each sparking wire and the extremity of its respective tube 73, thereby creating a spark. For adjusting the timing ring, a suitable rod 80 may be connected to the eye 81 of a member 82, which in turn is clamped between the two sections of the ring whereby the ring may be rocked slightly, as may be necessary.

In operation the tubular valve is revolving, as the several or multiple of pistons of the cylinders are reciprocated. Therefore, when the valve in rotating reaches a position, so that the pocket 27 assumes a position, so that the intake 19 is in communication with the combustion chamber of cylinder a, through the medium of the port 31, a charge is drawn or sucked into the combustion chamber of the cylinder a, owing to the piston 2 of the cylinder a moving on its downward suction stroke. When the piston 2 is moving upwardly on the compression stroke the charge is compressed, in which case the pocket 27 is out of registration with the port 31. By the time the piston 2 completes its compression stroke, the sparking terminal 54 reaches the port 31, at the same time the contacting terminal 59 reaches and contacts with the ball terminal 62, thereby creating a spark at the terminal 54, firing the charge, which will cause the piston to move downwardly upon its firing stroke. Then by the time the piston 2 starts upwardly on its exhaust stroke, the exhaust port 23 is in communication with the combustion chamber of the cylinder a, through the medium of the port 31 and the pocket 27, so that as the piston is moving upwardly on its exhaust stroke, the utilized gases will be discharged or exhausted out through the port 23. By the time the piston 2 completes its exhaust stroke, the intake port is again in communication with the combustion chamber of the cylinder a, through the medium of the pocket 27 and port 31 to receive the next charge, as the piston 2 is making its next suction stroke downwardly. The foregoing operations are enacted in each cylinder, therefore, as the piston 2 of the cylinder *a* is on its suction stroke, the piston 5 of the cylinder *d* is on its compression stroke, piston 3 is on its exhaust stroke, while a charge is being fired in the combustion chamber of cylinder *c*.

As piston 2 is on its compression stroke, the piston 5 is on its firing stroke, and the piston 3 is on its suction stroke, whereas the piston 4 is on its exhaust stroke.

When the piston 2 is on its firing stroke, the piston 5 is moving upwardly on its exhaust stroke, while the piston 3 is on its compression stroke, whereas the piston 4 is moving downwardly upon its suction stroke.

Therefore, while the piston 2 is exhausting the utilized gases, the piston 5 is on its suction stroke, in which case the piston 3 is moving downwardly on its firing stroke, and the piston 4 is compressing its drawn in charge. The foregoing operations in sequence are repeatedly performed in the multiple of cylinders in due order, according to the following table:—

|  | Cylinders. | | | |
| --- | --- | --- | --- | --- |
|  | *a.* | *d.* | *b.* | *c.* |
| 1st stroke | Suction | Compression. | Exhaust | Firing. |
| 2nd stroke | Compression. | Firing | Suction | Exhaust. |
| 3rd stroke | Firing | Exhaust | Compression. | Suction. |
| 4th stroke | Exhaust | Suction | Firing | Compression. |

It will thus be seen that an impulse is imparted to the crank shaft upon every firing stroke of each piston, thereby insuring smooth revoluble and rapid movements of the shaft, from which considerable power is obtainable.

The invention having been set forth, what is claimed as new and useful is:

1. In a rotary valve for a multiple cylinder internal combustion engine, a multiple of cylinders having ports at their upper ends, a transverse tubular valve casing connecting the upper ends of said cylinders and provided with lateral intake and exhaust ports for each cylinder, an elongated tubular valve mounted in said casing and provided with a plurality of pockets arranged in staggered relations and adapted to coöperate alternately with the intake ports, the ports of the cylinders and the exhaust ports, a bracket secured on the side of one of the end cylinders and provided with a tubular part having a bearing for one end of said tubular valve, a sparking mechanism on one end of the tubular valve, a sprocket keyed on said tubular valve between the tubular part of the bracket and the sparking mechanism, and means engaging the sprocket for imparting movement to the valve.

2. In a rotary valve, a multiple of cylinders arranged in parallelism, an elongated tubular valve casing sequentially and integrally connecting the upper ends of said cylinders, the upper end of each cylinder having a port of communication with said valve casing, said valve casing having diametrically oppositely disposed intake and exhaust ports for each cylinder, an elongated open ended tubular valve in said casing, a passage around the upper ends of said cylinders and having communication through said tubular valve, whereby cooling means may be passed therethrough, said tubular valve having a multiple of segmental pockets in staggered relations, to alternately register with the intake port, the ports of communication between the cylinders and the valve casing, and the exhaust ports, one end of said tubular valve having an extension, a bracket on the side of one end cylinder and provided with a tubular part axially alined with said casing, said tubular part being open ended to permit of the outflow of the cooling means and provided with a bearing at one end for the reception of the extension of the tubular valve, a sparking mechanism on said extension, a sprocket between the sparking mechanism and said tubular part of the bracket, and means engaging said sprocket for actuating said valve.

In testimony whereof I have signed my name to this specification in the presence of two subscribing witnesses.

RAY E. HICKS.

Witnesses:
JOSEPH FENIMORE,
WM. T. KENT.